United States Patent
Kirby et al.

(10) Patent No.: US 8,947,042 B2
(45) Date of Patent: Feb. 3, 2015

(54) WIRELESS POWER AND DATA TRANSFER FOR ELECTRONIC DEVICES

(75) Inventors: Miles A. Kirby, San Diego, CA (US); Ernest T. Ozaki, Poway, CA (US); Rinat Burdo, San Diego, CA (US); Virginia Walker Keating, San Diego, CA (US); Michael J. Mangan, San Diego, CA (US); Anne Katrin Konertz, Solana Beach, CA (US); Paul E. Jacobs, La Jolla, CA (US); William Von Novak, San Diego, CA (US); Roy F. Quick, Jr., San Diego, CA (US); Roy H. Davis, Del Mar, CA (US); Nigel P. Cook, El Cajon, CA (US); Lukas Sieber, Olten (CH); Hanspeter Widmer, Wohlenschwil (CH)

(73) Assignee: QUALCOMM Incorporated, San Diego, CA (US)

(*) Notice: Subject to any disclaimer, the term of this patent is extended or adjusted under 35 U.S.C. 154(b) by 737 days.

(21) Appl. No.: 12/614,272

(22) Filed: Nov. 6, 2009

(65) Prior Publication Data
US 2010/0194335 A1 Aug. 5, 2010

Related U.S. Application Data

(60) Provisional application No. 61/114,436, filed on Nov. 13, 2008, provisional application No. 61/151,828, filed on Feb. 11, 2009, provisional application No. 61/158,396, filed on Mar. 8, 2009, provisional
(Continued)

(51) Int. Cl.
*H02J 7/00* (2006.01)
*H02J 7/02* (2006.01)
*H02J 5/00* (2006.01)

(52) U.S. Cl.
CPC ........... *H02J 7/025* (2013.01); *H02J 5/005* (2013.01)
USPC ............................................ 320/108; 320/106

(58) Field of Classification Search
USPC .................................................. 320/108, 106
See application file for complete search history.

(56) References Cited

U.S. PATENT DOCUMENTS

| 7,375,493 | B2 * | 5/2008 | Calhoon et al. ............... 320/108 |
| 2003/0134639 | A1 | 7/2003 | Karger |

(Continued)

FOREIGN PATENT DOCUMENTS

| CN | 1441617 A | 9/2003 |
| CN | 101061386 A | 10/2007 |

(Continued)

OTHER PUBLICATIONS

International Search Report—PCT/US2010/026567, International Search Authority—European Patent Office—May 31, 2010.
(Continued)

*Primary Examiner* — Richard V Muralidar
(74) *Attorney, Agent, or Firm* — Knobbe Martens Olson & Bear, LLP

(57) ABSTRACT

Exemplary embodiments are directed to wireless power. A wireless charging device may comprise a charging region configured for placement of one or more chargeable devices. The charging device may further include at least one transmit antenna configured for transmitting wireless power within the charging region. Furthermore, the charging device is configured to exchange data between at least one chargeable device of the one or more chargeable devices.

45 Claims, 16 Drawing Sheets

Related U.S. Application Data application No. 61/164,402, filed on Mar. 28, 2009, provisional application No. 61/166,686, filed on Apr. 3, 2009, provisional application No. 61/227,934, filed on Jul. 23, 2009.

(56) References Cited

U.S. PATENT DOCUMENTS

| | | | |
|---|---|---|---|
| 2005/0127868 A1* | 6/2005 | Calhoon et al. | 320/108 |
| 2006/0113955 A1 | 6/2006 | Nunally | |
| 2006/0158152 A1 | 7/2006 | Taniguchi et al. | |
| 2006/0184705 A1 | 8/2006 | Nakajima | |
| 2007/0191074 A1 | 8/2007 | Harrist et al. | |
| 2007/0279002 A1 | 12/2007 | Partovi | |
| 2007/0290835 A1 | 12/2007 | Engel et al. | |
| 2008/0150754 A1 | 6/2008 | Quendt | |
| 2008/0258679 A1 | 10/2008 | Manico et al. | |
| 2009/0251309 A1 | 10/2009 | Yamasuge | |
| 2009/0261778 A1 | 10/2009 | Kook | |
| 2009/0308933 A1 | 12/2009 | Osada | |
| 2010/0148723 A1 | 6/2010 | Cook et al. | |
| 2010/0225270 A1 | 9/2010 | Jacobs et al. | |
| 2013/0249481 A1 | 9/2013 | Jacobs et al. | |

FOREIGN PATENT DOCUMENTS

| | | |
|---|---|---|
| CN | 101188365 A | 5/2008 |
| CN | 101330229 A | 12/2008 |
| FR | 2883428 A1 | 9/2006 |
| GB | 2352887 A | 2/2001 |
| JP | 2001186676 A | 7/2001 |
| JP | 2005151609 A | 6/2005 |
| JP | 2005210843 A | 8/2005 |
| JP | 2006141170 A | 6/2006 |
| JP | 2006166570 A | 6/2006 |
| JP | 2006314181 A | 11/2006 |
| JP | 2006353042 A | 12/2006 |
| JP | 2007166763 A | 6/2007 |
| JP | 2008148148 A | 6/2008 |
| JP | 2008283804 A | 11/2008 |
| JP | 2008301554 A | 12/2008 |
| JP | 2009253763 A | 10/2009 |
| KR | 20080036702 A | 4/2008 |
| WO | WO-2008109489 A2 | 9/2008 |
| WO | 2008133806 A1 | 11/2008 |

OTHER PUBLICATIONS

International Search Report & Written Opinion—PCT/US2009/068580, International Search Authority—European Patent Office—Apr. 21, 2010.

* cited by examiner

WIRELESS POWER AND DATA TRANSFER FOR ELECTRONIC DEVICES

CLAIM OF PRIORITY UNDER 35 U.S.C. §119

This application claims priority under 35 U.S.C. §119(e) to:

U.S. Provisional Patent Application No. 61/151,828 entitled "CHARGE PLUS AUTOMATIC CONNECTIONS" filed on Feb. 11, 2009, the disclosure of which is hereby incorporated by reference in its entirety;

U.S. Provisional Patent Application No. 61/164,402 entitled "CHARGING MULTIPLE DEVICES AND ENABLING INFORMATION SHARING BETWEEN THE DEVICES" filed on Mar. 28, 2009, the disclosure of which is hereby incorporated by reference in its entirety;

U.S. Provisional Patent Application No. 61/166,686 entitled "COMBINING WIRELESS CHARGING CAPABILITY AND THE ABILITY TO RECEIVE A WIRELESS CHARGE IN A SINGLE PORTABLE COMPUTING DEVICE" filed on Apr. 3, 2009, the disclosure of which is hereby incorporated by reference in its entirety;

U.S. Provisional Patent Application No. 61/158,396 entitled "WIRELESS CHARGING" filed on Mar. 8, 2009, the disclosure of which is hereby incorporated by reference in its entirety;

U.S. Provisional Patent Application No. 61/227,934 entitled "USING A DEVICE WITH A WLAN OR WAN MODEM FOR CONNECTION TO THE INTERNET BY A WIRELESS CHARGING STATION" filed on Jul. 23, 2009, the disclosure of which is hereby incorporated by reference in its entirety; and U.S. Provisional Patent Application No. 61/114,436 entitled "VALUE ADDING FUNCTIONS TO WIRELESS CHARGING" filed on Nov. 13, 2008, the disclosure of which is hereby incorporated by reference in its entirety.

BACKGROUND

1. Field

The present invention relates generally to wireless charging, and more specifically to programmable devices, bidirectional charging, and transmission of data between electronic devices while charging at least one of the electronic devices.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

A need exists for wireless charging of devices while exchanging information among the devices. A need also exists for bidirectional transmission of wireless power among devices, programmable wireless devices, and security features for wireless charging.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
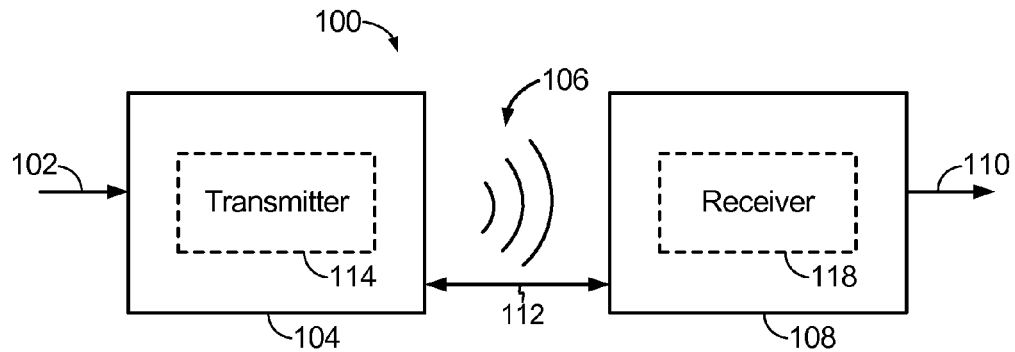
FIG. 1 shows a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are substantially identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
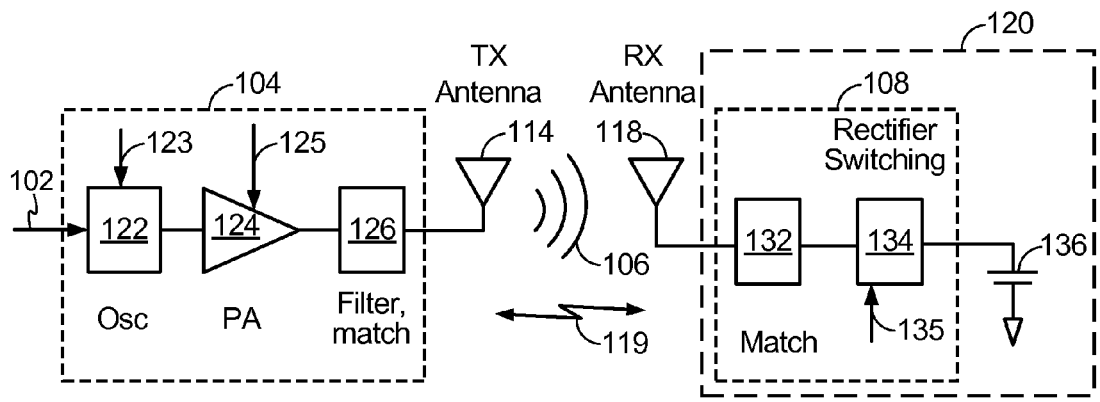
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118.

Figure 3:
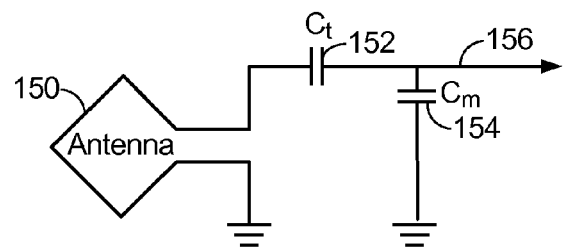
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

Exemplary embodiments of the invention include electronic devices configured for both receiving and transmitting wireless power. As such, various exemplary embodiments are directed to bidirectional wireless power transmission. Further, according to various exemplary embodiments, electronic devices may be configured to at least one of receive and transmit wireless power while simultaneously exchanging data with at least one other electronic device. Other exemplary embodiments include charging devices configured to synchronize data stored thereon with data stored on an associated chargeable device. Moreover, exemplary embodiments include electronic devices configured to program a charging device and electronic devices configured to transition to a charging profile upon detection of a charging source. Furthermore, exemplary embodiments include security features for wireless charging.

Figure 4:
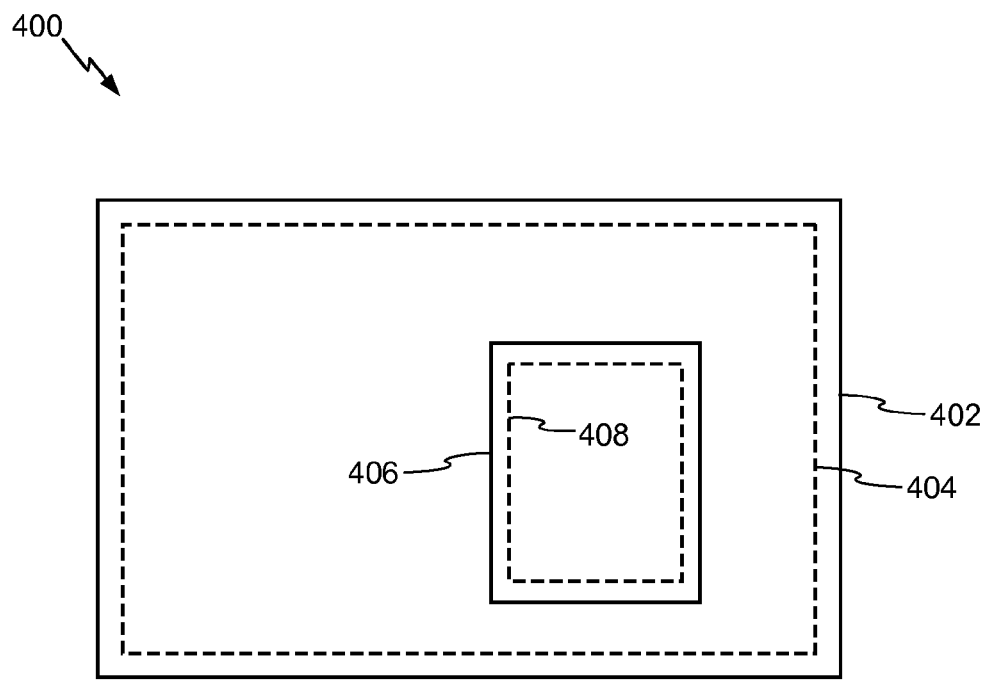
FIG. 4 depicts a charging system including a wireless charging device and a wirelessly chargeable device, in accordance with an exemplary embodiment of the present invention.

FIG. 4 depicts a charging system 400 including a charging device 402 having a transmit antenna 404 coupled thereto. Charging device 402 may comprise any known and suitable wireless charging device configured for transmitting wireless power with an associated charging region. As described more fully below, charging device 402 may be configured for generating and updating a charging profile of an associated chargeable device. Charging system 400 also includes a chargeable device 406 having an associated antenna 408. Chargeable device 406 may comprise any known and suitable chargeable device configured to wirelessly receive power. As non-limiting examples, chargeable device 406 may comprise a mobile telephone, a portable media player, a camera, a gaming device, a navigation device, a headset (e.g., a Bluetooth headset), a tool, a toy, or any combination thereof. As described more fully below, chargeable device 406 may be configured to receive wireless power from charging device 402.

More specifically, transmit antenna 404 may be configured to receive power, via a transmitter (e.g., transmitter 104 of FIG. 2), from a power source and, upon receipt of the power, may wirelessly transmit power within an associated near-field. Further, wireless power transmitted by transmit antenna 404 may be received by an antenna within an associated coupling mode-region. For example, power transmitted by transmit antenna 404 may be received by antenna 408 and stored within a battery (e.g., battery 136 of FIG. 2) within chargeable device 406. More specifically, power transmitted from transmit antenna 404 may be received by receive antenna 408 and a receiver, such as receiver 108 of FIG. 2, which is coupled to a battery of chargeable device 406.

Figure 5:
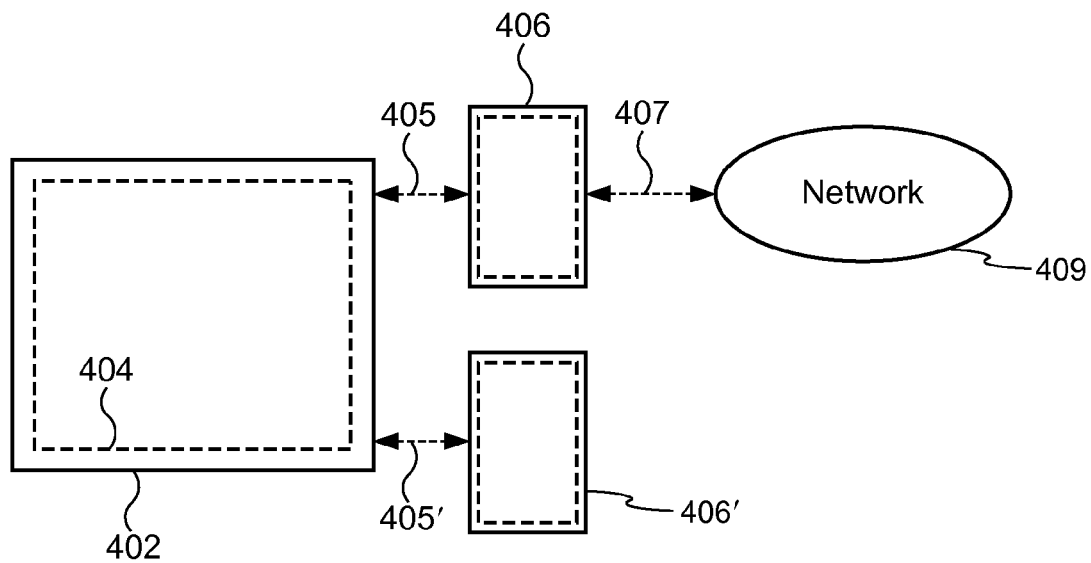
FIG. 5 illustrates a wireless charging device communicatively coupled to a network, according to an exemplary embodiment of the present invention.

Furthermore, in accordance with an exemplary embodiment, chargeable device 406 may be configured for exchanging data with charging device 402, and vice versa. More specifically, as an example, chargeable device 406 may be configured to establish a communication link 405 (see FIG. 5) with charging device 402 and, upon establishing communication link 405, may transmit information (e.g., audio files, data files, or video files) to charging device 402. Communication link 405 may be established through any known and suitable manner. For example, communication link 405 may be established via near-field communication (NFC) means, via reflected impedance means, via a local area network (LAN), or via a personal area network (PAN) such as a Bluetooth connection. It is noted that charging device 402 may be configured to establish communication link 405 with chargeable device 406. As described more fully below, chargeable device 406 may also be configured to establish a communication link 407 with a network 409.

Figure 6:
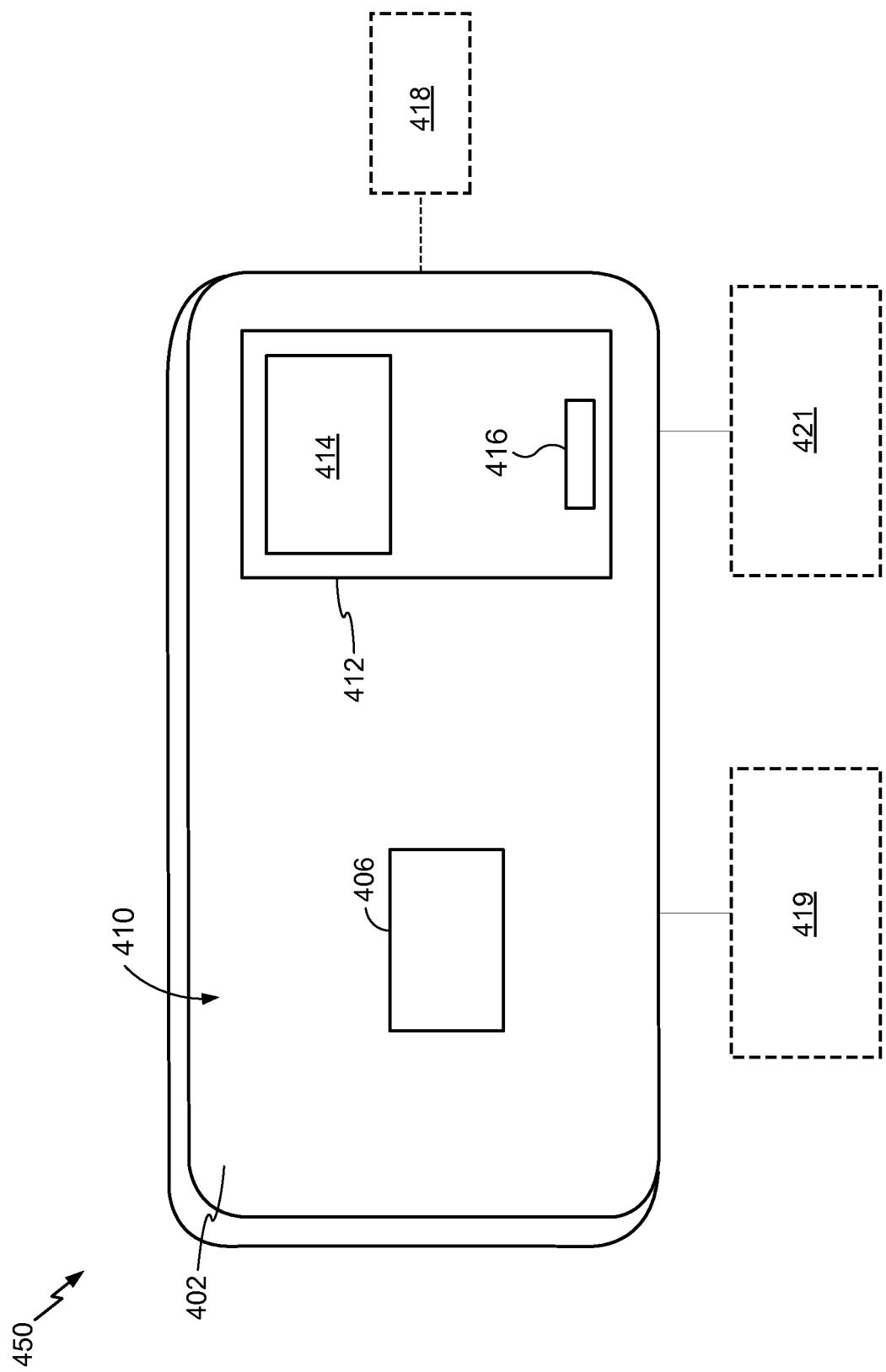
FIG. 6 illustrates a block diagram of a charging system including a wireless charging device, according to an exemplary embodiment of the present invention.

FIG. 6 illustrates a block diagram of a charging system 450 including wireless charging device 402. As illustrated, charging device 402 may comprise a charging region 410 and a user interface 412. Charging device 402 may be configured to wirelessly charge at least one chargeable device (e.g., chargeable device 406) positioned within charging region 410. Interface 412 may include any known and suitable switches, buttons, dials, keypads, the like, or any combination thereof. Interface 412 may be configured to accept inputs and commands and to present outputs. Further, interface 412 may be configured to enable a user to select data to be conveyed (i.e., via audio or visual means) by charging device 402.

Furthermore, interface 412 may include a display device 414, which may comprise, for example only, a touch screen device having multi-touch interactive capabilities to allow a device user to directly interact with charging device 402 in order to communicate a command thereto. Interface 412 may be configured to display data related to one or more chargeable devices positioned within charging region 410. For example only, interface 412 may be configured to display video, audio, alphanumeric text, graphics, or any combination thereof. Furthermore, interface 412 may include one or more speakers 416 configured for audibly presenting data, such as an audio file, received from a chargeable device positioned within charging region, such as chargeable device 406. It is noted that a device user may access data stored on chargeable device 406 via interface 412, or data may be transferred from chargeable device 406 to charging device 402 and subsequently accessed. Additionally, it is noted that charging device 402 may be configured for operable coupling to other devices, such as, for example only, an input device 418 (e.g., a keyboard) and output devices 419 and 421. By way of example only, output device 419 may comprise a laptop computer and output device 421 may comprise an entertainment system. It is further noted that interface 412 may include input devices such as an audio and/or video input device (e.g., camera and/or audio recorder).

During a contemplated operation of charging system 450, one or more chargeable devices (e.g., chargeable device 406) may be positioned within charging region 410 and may receive power wirelessly transmitted from charging device 402. Furthermore, while wireless power is being transmitted, a user, via interface 412, may select audio, video, images, alphanumeric text, graphics, or any combination thereof, from one or more of the chargeable devices positioned within charging region 410 to be presented by interface 412. Additionally, it is noted that display device 414 may be configured to replicate at least a portion of display of a selected chargeable device positioned within charging region 410. Furthermore, keyboard 418 may be configured to replicate at least a portion of a keyboard of the selected chargeable device. It is noted that charging device 402 may comprise additional functionality beyond the functionality of chargeable device 406. As an example, if chargeable device 406 is an iPod®, charging device 402 may include iTunes®, thus enabling a user to create a playlist, delete songs, add songs, or any other known functions that may not be available on chargeable device 406.

Figure 7:
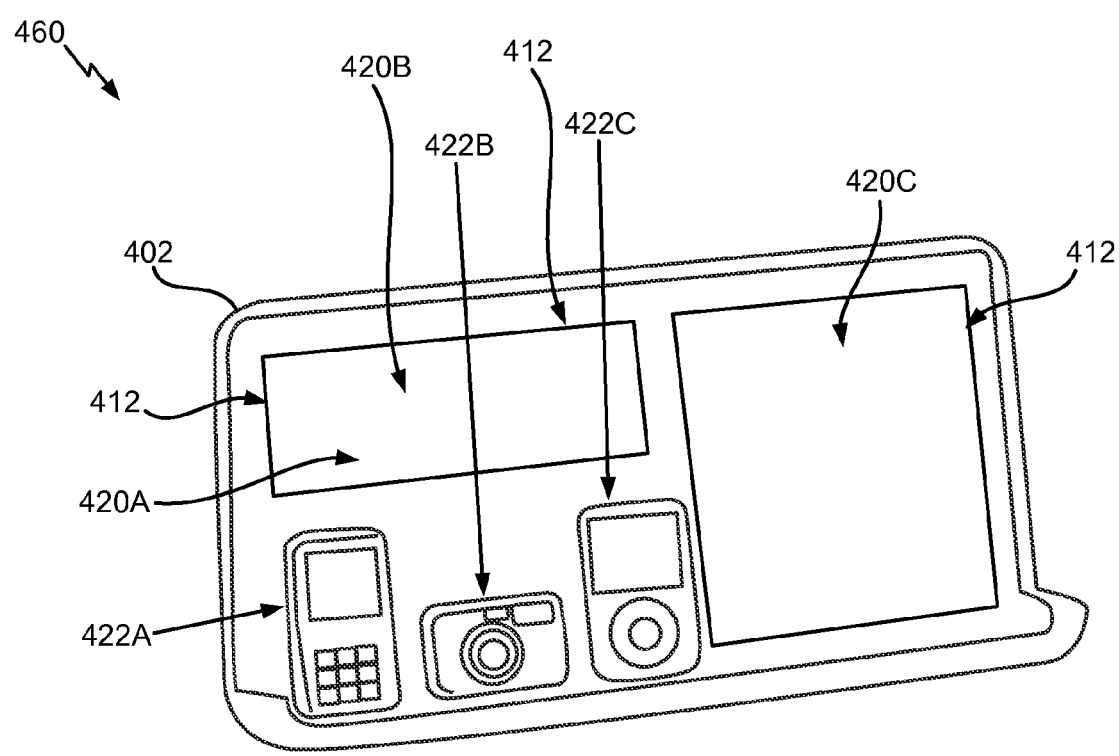
FIG. 7 depicts a wireless charging system including a charging device having an interface, in accordance with an exemplary embodiment of the present invention.

FIG. 7 depicts a wireless charging system 460 including wireless charging device 402 having interface 412 and one or more chargeable devices (e.g., chargeable device 422A, chargeable device 422B, or chargeable device 422C) positioned within an associated charging region 410 (FIG. 6). As illustrated in FIG. 7, interface 412 may include a plurality of displays 420A, 420B and 420C (shown as inactive in FIG. 7 but active in FIGS. 8 and 9), wherein each display 420A, display 420B, and display 420C may be configured to output information relating to one or more chargeable devices 422 positioned within an associated charging region 410 (FIG. 6). Specifically, each display 420A, display 420B, and display 420C may be configured to output video, audio, images, graphics, alphanumeric text, indicators, or any combination thereof relating to the one or more chargeable devices 422.

In accordance with an exemplary embodiment of the present invention, charging system 460 may be configured to exchange data between charging device 402 and one or more chargeable devices (e.g., chargeable device 422A). More specifically, upon establishing data or communication link 405 (see FIG. 5), data (e.g., music, videos, images, calendars, contacts, etc.) may be transferred from, for example, a 'public' directory of a chargeable device (e.g., chargeable device 422A) to charging device 402. Furthermore, after data or communication link 405 has been established and data is transferred from the chargeable device to charging device 402, the transferred data may be presented in one or more displays 420A, 420B or 420C. For example, chargeable device 422B may transmit one or more photographs to charging device 402. Upon receipt of the one or more photographs, charging device 402 may be configured to store the one or more photographs and, therefore, photographs stored on charging device 402 may be synchronized with photographs stored on chargeable device 422C. Accordingly, a device user may be able to access his or her photographs from each of charging device 402 and chargeable device 422B. Further, charging device 402 may be configured to display the one or more photographs in one or more displays (e.g., display 420C).

Figure 8:
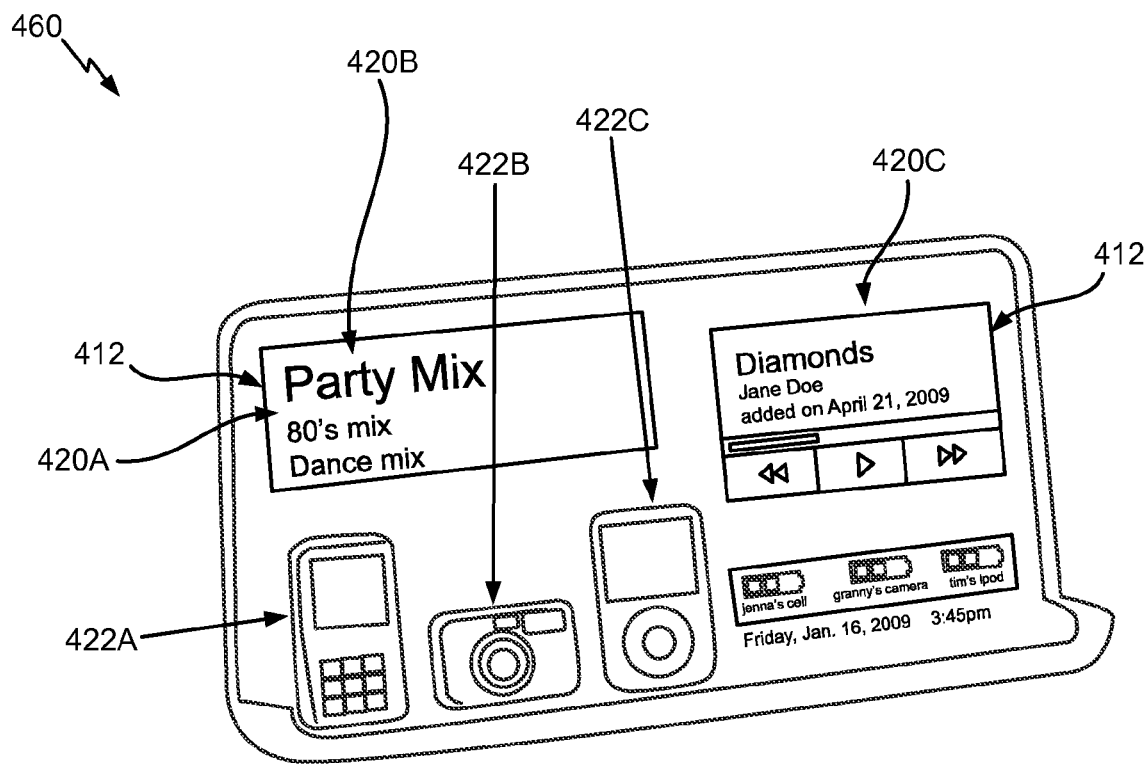
FIG. 8 is another depiction of the wireless charging system illustrated in FIG. 7.

As another example, audio files stored on a chargeable device (e.g. chargeable device 422C) may be transferred to charging device 402 to synchronize audio files stored on charging device 402 with audio files stored on chargeable device 422C. Accordingly, a device user may be able to access his or her, for example, audio files from each of charging device 402 and chargeable device 422C. Furthermore, charging device 402 may be configured to audibly convey an audio file transferred from chargeable device 422C. Furthermore, for example only, as illustrated in FIG. 8, charging device 402 may be configured to display an audio "playlist" and related data in displays 420A and 420B, and a graphical and textual depiction of an audio file currently being played in display 420C.

As yet another example, charging system 460 may be configured to synchronize calendar data stored on charging device 402 with calendar data stored on one or more chargeable devices (e.g., chargeable device 422A). Accordingly, a device user may be able to access his or her calendar from each of charging device 402 and chargeable device 422A.

Figure 9:
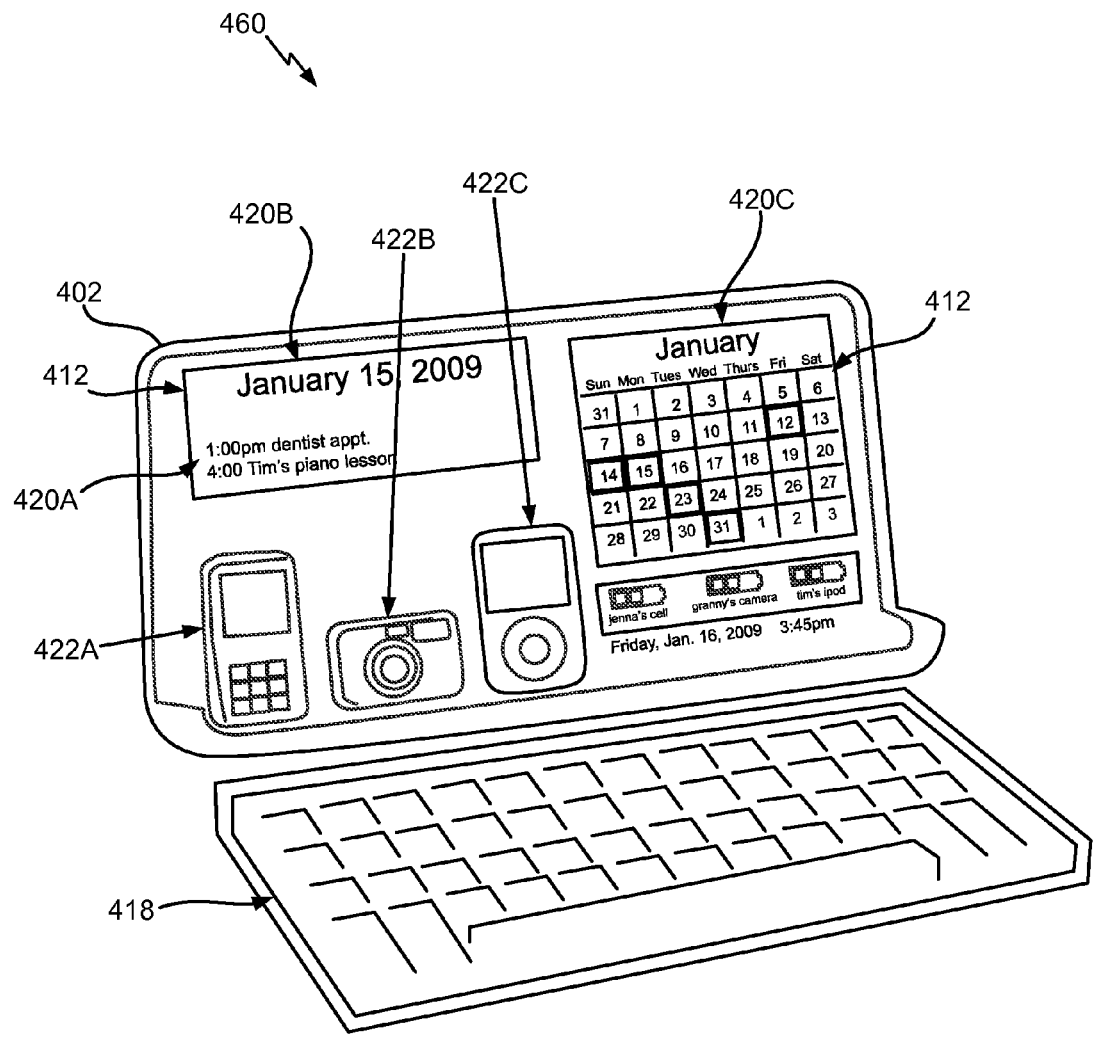
FIG. 9 is yet another depiction of the wireless charging system illustrated in FIG. 7.

Further, as illustrated in FIG. 9, charging device 402 may be configured to display information related to a calendar in one or more displays 420A, 420B, and 420C. More specifically, for example only, charging device 402 may be configured to display a date in display 420B, a list of one or more calendar items in display 420A, and a depiction of a calendar in display 420C. Furthermore, charging system 460 may be configured to synchronize a plurality of calendars with a universal calendar stored on charging device 402. For example, calendar data stored on electronic device 422A and calendar data stored on electronic device 422C may be synchronized with calendar data related to a universal calendar stored on charging device 402.

Moreover, in accordance with another exemplary embodiment of the present invention, charging system 460 may be configured to exchange data between a first chargeable device (e.g., chargeable device 422A) and a second chargeable device (e.g., chargeable device 422C). For example only, data related to a calendar stored on chargeable device 422A may be synchronized with data related to a calendar stored on chargeable device 422C. Additionally, charging system 460 may be configured to exchange data between a chargeable device positioned within an associated charging region (e.g., electronic device 422A) and another electronic device, which is communicatively coupled to charging device 402. For example, a list of contacts stored on chargeable device 422A may be transferred to and stored on laptop computer 419 (see FIG. 5), which is communicatively coupled to charging device 402. It is noted that electronic devices (e.g. electronic device 422A and electronic device 422C) may be communicatively coupled directly. For example, charging device 402 may enable a communication link between electronic device 422A and electronic device 422C and thereafter, electronic device 422A and electronic device 422C may exchange data directly.

It is noted that charging device 402 may be configured to transmit data (video, audio, images, graphics, alphanumeric text, or any combination thereof relating to one or more chargeable devices) to output devices 419 and 421. Accordingly, output device 419, which may comprise a laptop computer, and output device 421, which may comprise an entertainment system, may output the data. It is further noted that while one or more chargeable devices are positioned within a charging region of charging device 402, the one or more chargeable devices may receive power wirelessly from charging device 402. As a result, and, in accordance with an exemplary embodiment of the present invention, one or more chargeable devices may receive wireless power from charging device 402 and, simultaneously, data may be shared amongst the one or more chargeable devices and charging device 402. Moreover, charging device 402 may simultaneously output data associated with the one or more chargeable devices.

Furthermore, with reference again to FIG. 5, chargeable device 406 may be configured to establish wireless communication link 407 with network 409, which may comprise a local network or a publicly accessible network, such as the Internet. Wireless communication link 407 may comprise any known and suitable wireless communication link. Accordingly, charging device 402 may be configured to utilize chargeable device 406, which is positioned within an associated charging region, to establish a communication link with network 409, such as the Internet. As a result, charging device 402 may request and receive data from network 409. According to one exemplary embodiment, charging device 402 may be configured to utilize chargeable device 406 as a wireless modem and may communicate directly with network 409. In another exemplary embodiment, charging device 402 may be configured to transmit a data request to chargeable device 406 and, thereafter, chargeable device 406 may request and retrieve the data from network 409. Upon receipt of the requested data, chargeable device 406 may convey the data to charging device 402.

As an example, charging device 402 may download software or firmware updates from network 409 to be installed thereon. Further, charging device 402 may download software or firmware updates from network 409 to be installed on another chargeable device 406'. More specifically, charging device 402 may download software or firmware updates for chargeable device 406' via communication links 405 and 407 and, thereafter, transmit the software or firmware updates to chargeable device 406' via communication link 405'. As a more specific example, charging device 402 may utilize a mobile telephone (e.g. chargeable device 406) positioned within an associated charging region to establish a communication link (i.e., communication links 405 and 407) with the Internet and, further, may download a software patch for a digital camera (e.g., chargeable device 406') also positioned within an associated charging region. The software patch may then be conveyed to the digital camera via a communication link (i.e., communication link 405') between charging device 402 and the digital camera. It is noted that a charging level of a battery associated with chargeable device 406' may be considered before establishing communication link 407 if a rate of energy use required to establish and maintain communication link 407 is greater than a rate of energy receiver from charging device 402.

As mentioned above, and in accordance with an exemplary embodiment of the present invention, charging device 402 may be configured for generating, and updating, a charging profile related to an associated chargeable device. More specifically, charging device 402 may be configured for generating, storing, and updating data related to a charging history of the associated chargeable device. For example, charging device 402 may keep record of a number of times a chargeable device has been charged, time durations for charging periods of the chargeable device, and times of day that the chargeable device has been charged. Accordingly, as an example, using an associated charging profile, charging device 402 may be configured to determine that a user of a specific chargeable device usually charges the chargeable device at approximately 10:00 PM for approximately an eight hour time duration. As a result, a charging profile including data related to a charging history of a specific chargeable device may enable charging device 402 to better predict charging habits of a user associated with the chargeable device.

According to an exemplary embodiment, charging device 402 may be configured to utilize one or more charging profiles of associated chargeable devices to determine optimal times for downloading data from a network, downloading data from a chargeable device, uploading data to a chargeable device, or any combination thereof. For example, if charging device 402 wishes to synchronize data stored within charging device 402 with data stored on a media player, which is positioned within an associated charging region 410 (FIG. 6), charging device 402 may use a charging profile of the media player to determine an optimal time to complete the operation. As another example, if charging device 402 wishes to establish a communication link with the Internet via a mobile telephone and download a software patch for a digital camera, charging device 402 may use a charging profile of the digital camera and a charging profile of the mobile telephone to determine an optimal time to complete the operation.

Figure 10:
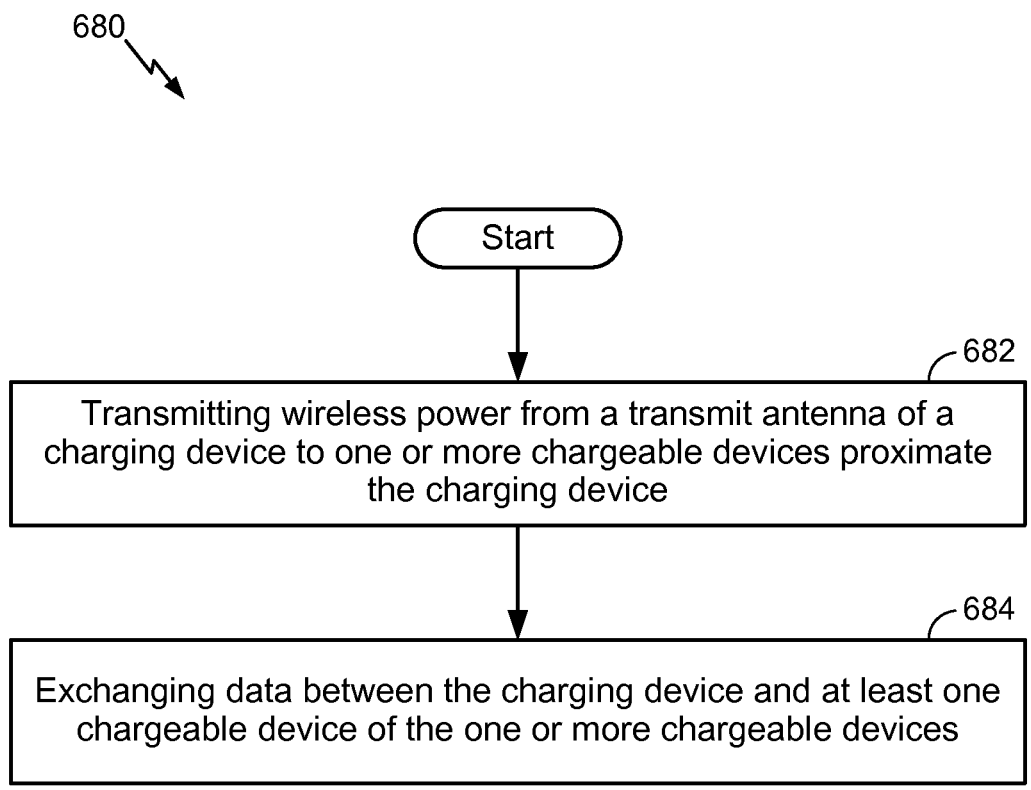
FIG. 10 is a flowchart illustrating a method, in accordance with an exemplary embodiment of the present invention.

FIG. 10 is a flowchart illustrating a method 680, in accordance with one or more exemplary embodiments. Method 680 may include transmitting wireless power from a transmit antenna of a charging device to one or more chargeable devices proximate the charging device (depicted by numeral 682). Method 680 may further include synchronizing data stored on the charging device with data stored on at least one chargeable device of the one or more chargeable devices (depicted by numeral 684).

While wireless power transmission may occur when one device in a wireless power transmission system includes a transmitter and another device includes a receiver, a single device may include both a wireless power transmitter and a wireless power receiver. Accordingly, such an embodiment could be configured to include dedicated transmit circuitry (e.g., a transmit power conversion circuit and a transmit antenna) and dedicated receiver circuitry (e.g., a receive antenna and a receive power conversion circuit). Accordingly, the various exemplary embodiments disclosed herein identify bidirectional power transmission, namely, the capability for a device to both receive wireless power at the device and to transmit wireless power from the device.

Various benefits of such a configuration include the ability of a device to receive and store wireless power and then to subsequently transmit or "donate" stored power to another receiving or "absorbing" device. Accordingly, such a configuration may also be considered as a "peer-to-peer" "charitable" charging configuration. Such a device-charging arrangement provides considerable convenience in location under which charging occurs (i.e., the receiver or "absorbing" device need not necessarily receive a charge from an inconveniently located or unavailable charging pad).

Figure 11:
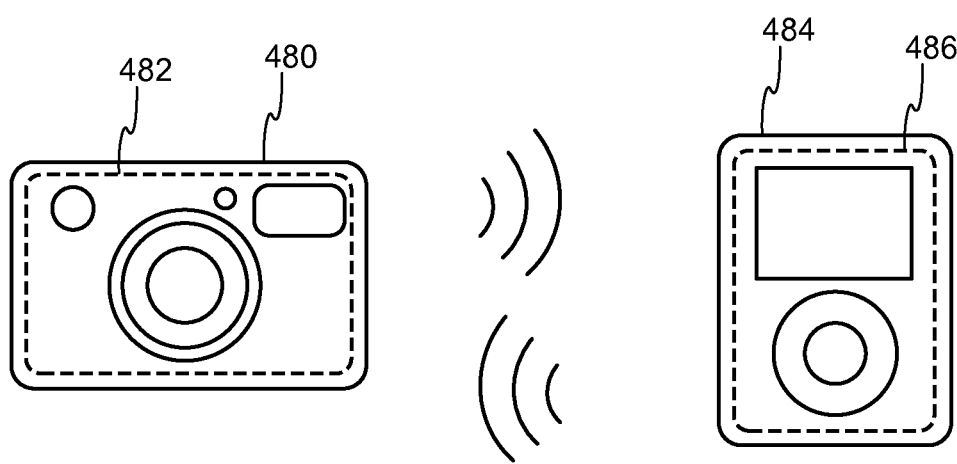
FIG. 11 illustrates a plurality of electronic devices configured for receiving and transmitting wireless power, according to an exemplary embodiment of the present invention.

In accordance with another embodiment of the present invention, a chargeable device having at least one antenna may be configured to transmit wireless power to at least one other chargeable device and receive wireless power from at least one other chargeable device. More specifically, with reference to FIG. 11, first chargeable device 480 having antenna 482 may be configured to transmit wireless power to second chargeable device 484 having antenna 486, and vice versa. Accordingly, each of first chargeable device 480 and second chargeable device 484 may be configured for bidirectional wireless charging. An exemplary approach for such bidirectional wireless charging is described in U.S. patent application Ser. No. 12/552,110, entitled "BIDIRECTIONAL WIRELESS POWER TRANSMISSION" filed on Sep. 1, 2009, the details of which are incorporated by reference herein.

Figure 12:
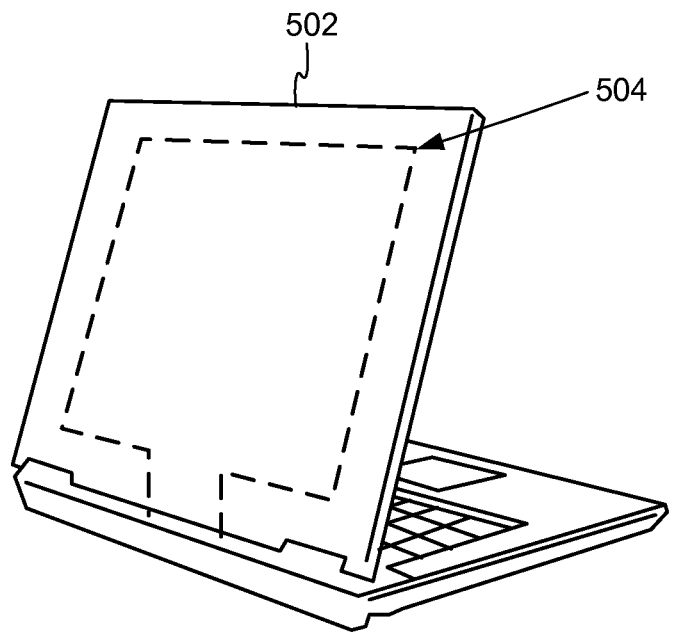
FIG. 12 depicts an electronic device having an antenna coupled thereto, according to an exemplary embodiment of the present invention.
Figure 13:
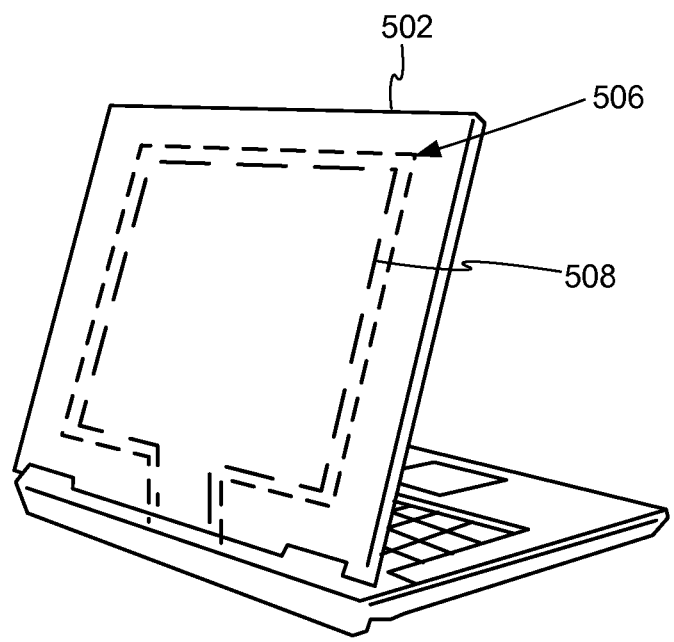
FIG. 13 illustrates an electronic device having a transmit antenna and a receive antenna coupled thereto, in accordance with an exemplary embodiment of the present invention.

FIG. 12 illustrates an electronic device 502 having an antenna 504 coupled thereto. Electronic device 502 may comprise any known electronic device. In the example illustrated in FIG. 12, electronic device 502 comprises a laptop computer wherein antenna 504 is coupled to a lid (i.e., the monitor) of the laptop computer. According to one exemplary embodiment, antenna 504 and associated circuitry (not shown) may be configured for both receiving wireless power and transmitting wireless power. According to another exemplary embodiment, as illustrated in FIG. 13, electronic device 502 may comprise a receive antenna 506 and associated receiver circuitry (not shown) configured for receiving wireless power and a transmit antenna 508 and associated transmitter circuitry (not shown) configured for transmitting wireless power. It is noted that each of antenna 504, receive antenna 506, and transmit antenna 508 may be coupled to electronic device 502 in a manner so as to avoid any electrical interference between the antennas and any metallic components of electronic device 502 (e.g., a metallic display of electronic device 502).

In either exemplary embodiment, the antenna configured to receive wireless power (i.e., antenna 504 or receive antenna 506) may interface with an element of electronic device 502, such as a power circuit (e.g., matching circuit 132 and rectifier and switching circuit 134 of FIG. 2), a battery (e.g., battery 136 of FIG. 2), or any combination thereof. Accordingly, power received by antenna 504 or antenna 506 may be conveyed to the element (e.g., a battery, a power circuit, or any combination thereof) of electronic device 502. Further, the antenna configured to transmit wireless power (i.e., antenna 504 or transmit antenna 508) may interface with a power source of electronic device 502, such as a power circuit (e.g., oscillator 122, matching circuit 132, and rectifier and switching circuit 134 of FIG. 2), a battery (e.g., battery 136 of FIG. 2), or any combination thereof. Accordingly, power may be conveyed from the power source (e.g., a battery, a power circuit, or any combination thereof) of electronic device 502 to antenna 504 or antenna 508, which may then wirelessly transmit power within an associated near-field region.

Figure 14:
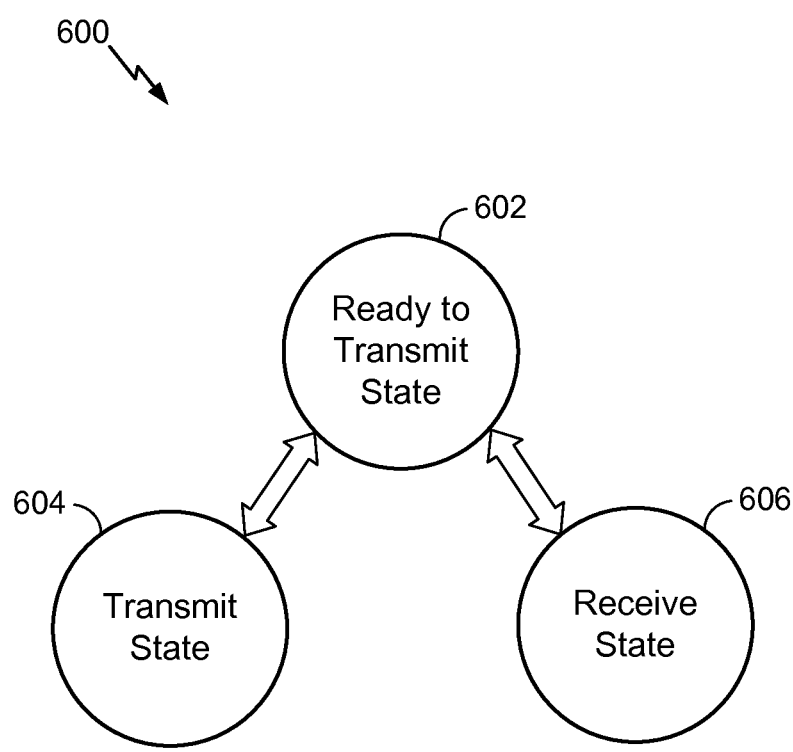
FIG. 14 illustrates a state machine diagram depicting operational states of an electronic device configured for receiving and transmitting wireless power, according to an exemplary embodiment of the present invention.

FIG. 14 illustrates a state machine diagram 600 for an electronic device configured for both receiving wireless power and transmitting wireless power. At any time while an energy level (i.e., an amount of battery charge) of the electronic device (e.g., electronic device 502) is greater than a predetermined threshold level, the electronic device may operate in a "READY to TRANSMIT STATE" 602. Accordingly, if the electronic device lacks a sufficient charge to charge another electronic device, or if doing so would significantly drain the power from the electronic device rendering it in need of immediate charge, the electronic device may not operate in the "READY to TRANSMIT STATE" 602.

If at any time while the electronic device is in READY to TRANSMIT ENERGY STATE 602, another electronic device configured for receiving a wireless charge is positioned within a charging region of the electronic device, an authentication process between the electronic devices may occur. After the devices have been successfully authenticated, the electronic device may transition to a "TRANSMIT STATE" 604, wherein the electronic device may transmit power to the another chargeable device. Furthermore, if at any time while the electronic device is in READY to TRANSMIT ENERGY STATE 602, the electronic device is positioned within a charging region of another electronic device configured to transmit wireless power, an authentication process between the electronic devices may occur. Upon successful authentication, the electronic device may transition to a "RECEIVE STATE" 606, wherein the electronic device may receive a wireless charge from the another electronic device. It is noted that a determination of whether to accept or decline a charge request from a chargeable device may be dependent on a user-defined preference. Moreover, a device user may receive a real-time prompt asking whether to accept or decline a power request. It is further noted that the electronic device may be configured to simultaneously transmit wireless power and receive wireless power. Accordingly, the electronic device may simultaneously be in TRANSMIT STATE 604 and RECEIVE STATE 606.

As will be understood by a person having ordinary skill in the art, "surface computing" is a term associated with a technology wherein a user may interact with a computer and/or an electronic device through the surface instead of a keyboard, mouse, or monitor. A multi-touch surface may facilitate surface computing by allowing the manipulation of objects displayed on a surface through surface contact (e.g., touch by multiple fingers or multiple users). Further, content may be transferred between two or more devices positioned on the surface of the object using a unique identifier assigned to each device.

Figure 15:
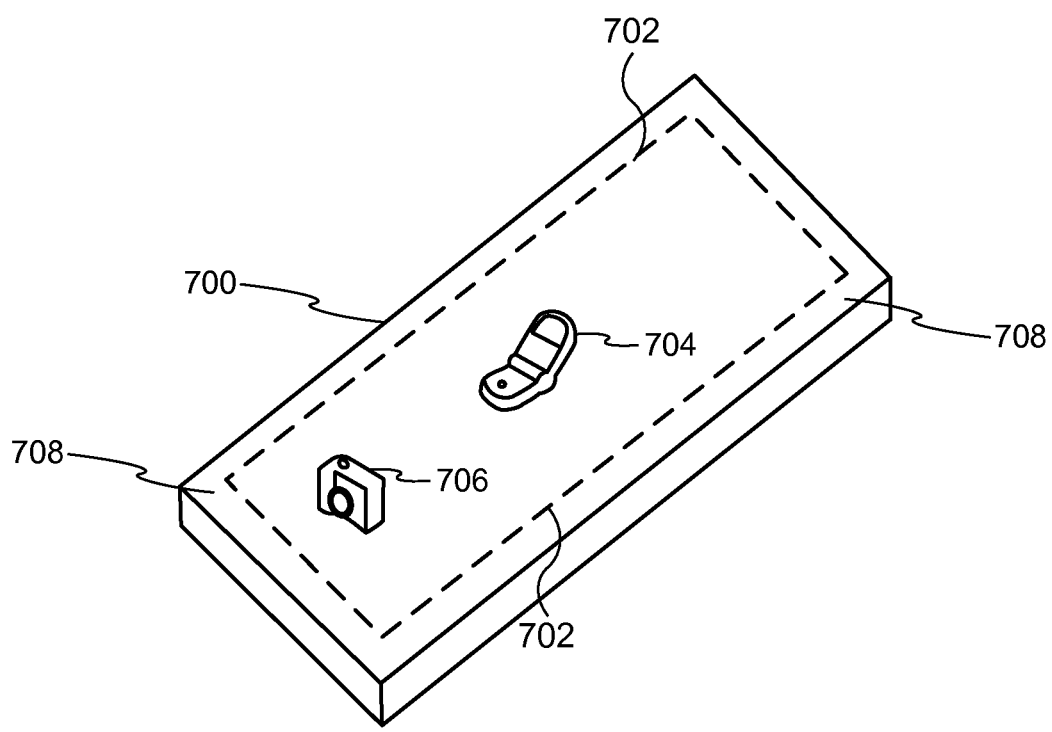
FIG. 15 illustrates a surface computing device configured for transmitting wireless power, according to an exemplary embodiment of the present invention.

FIG. 15 illustrates a surface computing device 700 configured for wireless charging, in accordance with various exemplary embodiments of the present invention. Device 700 may include a display, which may comprise a touch sensitive plasma screen. Further, device 700 may include cameras, projectors, speakers, etc., as will be understood by a person having ordinary skill in the art. In addition, wireless charger 700 may include a transmit antenna 702 configured to wirelessly transmit power within an associated near-field region.

As configured, device 700 may detect and authenticate the presence of an electronic device positioned on a surface 708 of device 700. The presence of a device, for example, a mobile phone 704 or a digital camera 706, positioned upon device 700 may be determined by detecting a field disturbance of a magnetic field established between transmitter antenna 702 and an antenna (not shown) within an electronic device (e.g., mobile phone 704) and configured for receiving wireless power. In addition to detecting the presence of an electronic device, a field disturbance may indicate that an electronic device is ready to receive wireless power, or ready to transmit or receive information. For example, an electronic device positioned on device 700, such as digital camera 706, may transmit a signal, via a wireless charging protocol, requesting a wireless charge, requesting establishment of a wireless data link, such as a Bluetooth (BT) connection, or both. It is noted that any known and suitable data link may be within the scope of the present invention. For example, a data link may comprise a Bluetooth connection, a Wi-Fi connection, a 60 GHz connection, or a UWB connection.

It is noted that before a wireless data link (e.g. a BT connection) may be established between an electronic device (e.g., mobile phone 704 or digital camera 706) and device 700, device 700 may initiate a key exchange to 'pair' the electronic device and device 700. Once paired, a data link may be initiated, allowing data to transfer between device 700 and the electronic device being charged. More specifically, upon establishing the data link, data, such as photographs, videos, or music, may be transferred from, for example, a 'public' directory of the electronic device to device 700. Furthermore, after a data link has been established and data is transferred from the electronic device to device 700, a user may interact with the data in a user-friendly, multi-touch way, while the electronic device positioned on surface 708 receives a wireless charge. As an example, data transferred from the electronic device may be conveyed (e.g., photographs may be displayed or music may be played) by device 700 while the electronic device is charging. It is noted that a device user may access and interact with data stored on the electronic device without transferring the data to device 700.

Figure 16:
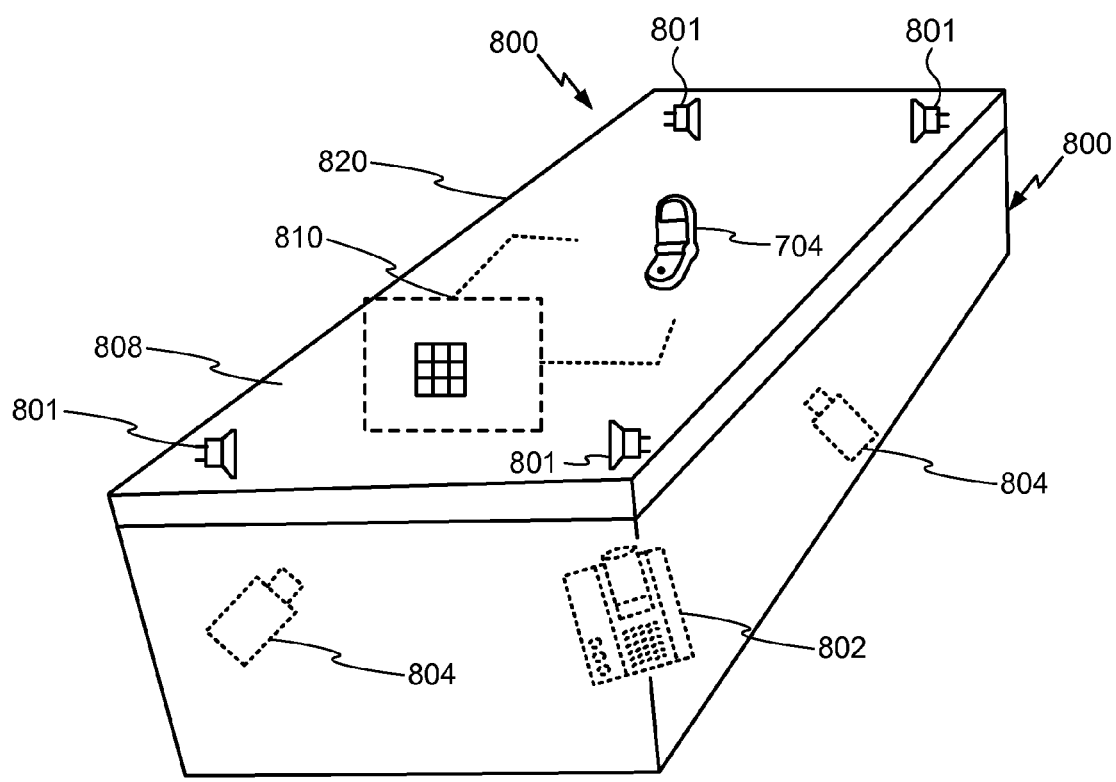
FIG. 16 illustrates another surface computing device configured for transmitting wireless power, according to an exemplary embodiment of the present invention.

FIG. 16 illustrates another surface computing device 800 configured for wireless charging, in accordance with various exemplary embodiments of the present invention. Device 800 includes a transmit antenna 820 configured to wirelessly transmit power within an associated near-field region. According to one exemplary embodiment, device 800 may be implemented as a multi-touch surface configured to display an interactive menu having interactive elements (i.e., controls) associated with at least one of the one or more electronic devices positioned thereon. Device 800 may comprise a camera 804 and projector 802 configured for receiving and transmitting images onto a surface 808 of device 800. Image 810 is one such image representing a keypad from mobile phone 704 projected onto surface 808 of device 800. A projected image of a keypad may enhance the use of mobile phone 704 by presenting a larger area to manipulate phone controls over that available in the confined space available on an actual keypad of mobile phone 704. Additionally, a projected image of a keyboard may include additional functionality compared to mobile phone 704. For example, a projected image may display a full QWERTY keyboard for a mobile phone that only includes a numeric pad. Furthermore, device 800 may include speakers 801 configured for audibly conveying data, such as an audio file, received from an electronic device, such as mobile phone 704.

Figure 17:
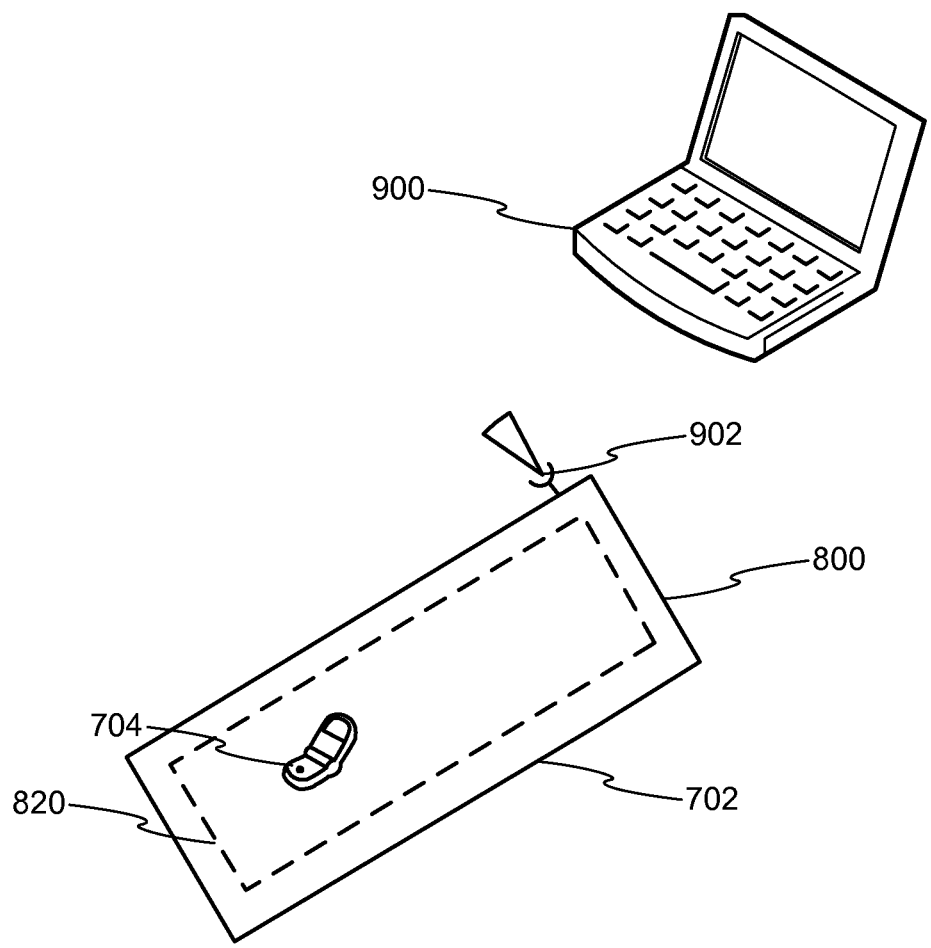
FIG. 17 depicts a system including a surface computing device and a computer, in accordance with an exemplary embodiment of the present invention.

According to another exemplary embodiment, device 800 may be configured to communicate with a stand-alone computer. For example only, device 800 may be configured to communicate with a stand-alone computer via wireless means, such as via a USB adapter or a USB dongle. Accordingly, the stand-alone computer and an associated display may be used to facilitate information exchanges to and from electronic devices placed on device 800 or via the Internet. More specifically, FIG. 17 illustrates a system wherein device 800 is configured to communicate with a computer 900 through a USB dongle 902, which provides a communication link between device 800 and computer 900 by means of, for example, a Bluetooth connection. In this exemplary embodiment, a monitor of computer 900 may be used to manipulate data on the electronic device (e.g., mobile phone 704) positioned upon the surface of device 800. Additionally, computer 900 may provide a communication link to the Internet to enable a connection between the electronic device and the Internet. Accordingly, for example, data may be transferred between mobile phone 704 and computer 900 while the mobile phone 704 is being charged via transmit antenna 820.

As will be understood by a person having ordinary skill in the art, a mobile telephone may be programmed to operate in various profile settings. For example, an "alert mode," and "alert volume," and an "alert tone" may each be programmable. More specifically, for example only, a mobile telephone may be programmed to operate in a "silent" mode, a "normal" mode, a "loud" mode, or a "vibrate" mode. Furthermore, a mobile telephone may be programmed to operate at various volume levels, such as a "low" volume, a "medium" volume, or a "high" volume. Moreover, an "alert tone" may be programmable and may comprise, for example, a "beep," a "melody," or a "ring."

Figure 18:
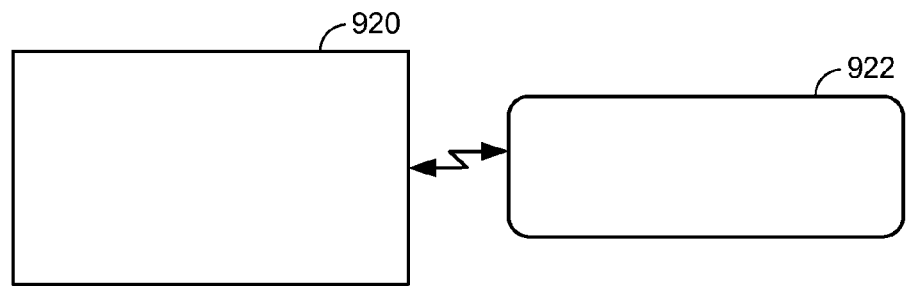
FIG. 18 illustrates a chargeable device configured to transition into a user-defined charging profile upon detection of a power source, in accordance with an exemplary embodiment of the present invention.

FIG. 18 illustrates a chargeable device 920, which may comprise, for example only, a mobile telephone. In accordance with an exemplary embodiment of the present invention, chargeable device 920 may be configured to automatically transition from its current profile setting into a user-defined "charging" profile upon detection of a power source 922. For example only, power source 922 may comprise either a wireless charging device or a wired power source. Furthermore, according to another exemplary embodiment of the present invention, chargeable device 920 may be configured to automatically transition back to a prior profile setting upon removal of power source 922. By way of example only, chargeable device 920, which may initially be programmed (i.e., set) to a "vibrate" profile, may, upon detection of power source 922, automatically transition into a user-defined "charging" profile, which may comprise a "melody" alert tone at a "high" volume. Additionally, upon removal of power source 922, chargeable device 920 may automatically transition from the "charging" profile back to the profile in which chargeable device 920 was operating prior to detection of power source 922 (i.e., "vibrate" profile).

It is noted that power source 922 may be detected via any known manner. For example, in an exemplary embodiment wherein power source 922 comprises a wired power source, power source 922 may be detected upon coupling chargeable device 920 to power source 922 via a power connector, such as a power cord. Moreover, in an exemplary embodiment wherein power source 922 comprises a wireless power source, power source 922 may be detected by, for example only, near-field communication (NFC) means or reflected impedance means.

As will also be understood by a person having ordinary skill in the art, a wireless charging device (e.g., charging device 402) may comprise various wireless charging user-programmable functions, which may be programmed by a user via a user-interface (e.g., a keyboard or a display) associated with the wireless charging device. For example, a wireless charging device may be programmed, via an associated interface positioned thereon, to automatically reduce or cease power transmission during daytime hours and automatically increase power transmission during nighttime hours. As another example, a wireless charging device may be programmed, via an associated interface positioned thereon, to transmit power wirelessly for a specified duration. As yet another example, a wireless charging device may be programmed, via an associated interface positioned thereon, to automatically reduce power transmission upon determining that a human is proximate the wireless charging device.

Figure 19:
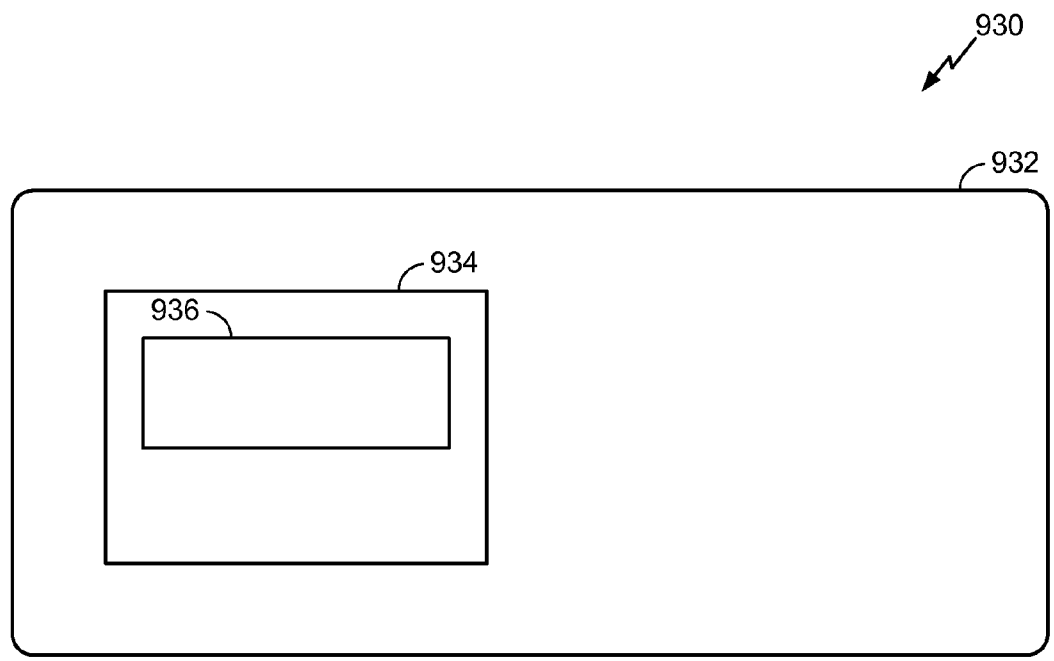
FIG. 19 illustrates a charging system including a wireless charging device and at least one electronic device, in accordance with an exemplary embodiment of the present invention.

FIG. 19 illustrates a charging system 930 having a wireless charging device 932 and at least one electronic device 934. In accordance with an exemplary embodiment of the present invention, electronic device 934 may include an interface 936, such as a multi-media interface, and may be configured for programming various wireless charging functions of wireless charging device 932. It is noted that electronic device 934 may comprise necessary multi-media functionality for remotely programming another electronic device, as will be understood by a person having ordinary skill in the art. Furthermore, charging device 932 and electronic device 934 may each include a standardized wireless communication interface to enable for wireless communication there-between. Accordingly, charging system 930 may enable a user to program any user-programmable function of charging device 932 via interface 936 of electronic device 934. For example only, charging device 932 may be programmed, via interface 936 of electronic device 934, to wirelessly transmit power for a specified time duration. As another example, charging device 932 may be programmed, via interface 936 of electronic device 934, to automatically reduce power transmission during daytime hours (e.g., from 8 AM to 8 PM) and increase power transmission during nighttime hours (e.g., from 8 PM to 8 AM).

Figure 20:
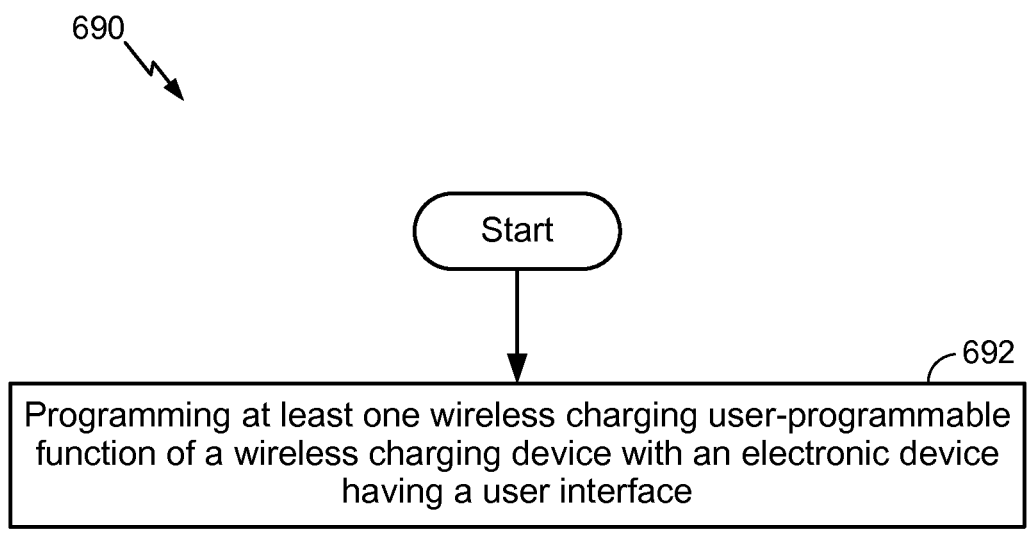
FIG. 20 is a flowchart illustrating another method, in accordance with an exemplary embodiment of the present invention.

FIG. 20 is a flowchart illustrating another method 690, according to one or more exemplary embodiments. Method 690 may include programming at least one user-programmable function of a wireless charging device with an electronic device having a multi-media interface (depicted by numeral 692).

Figure 21:
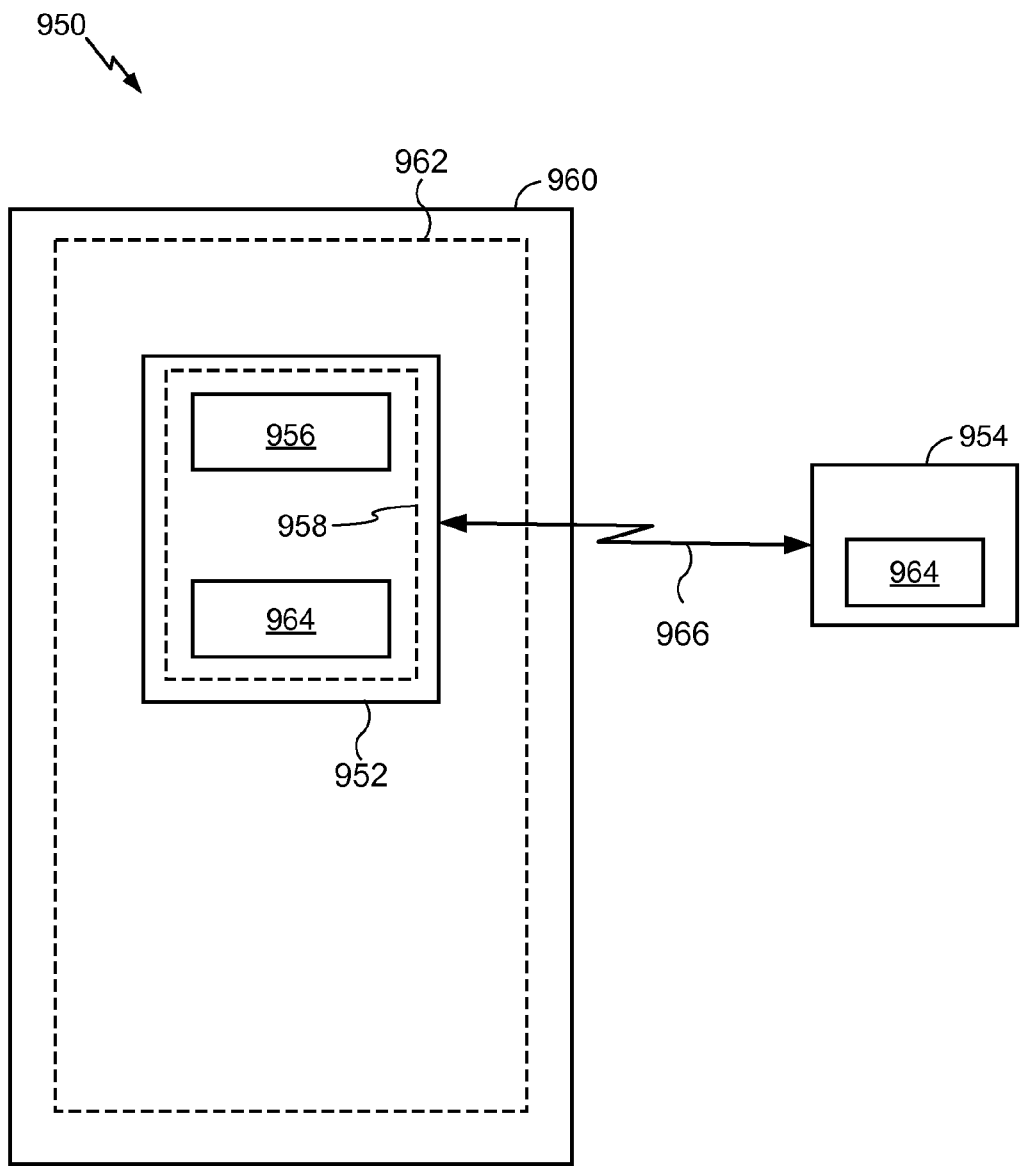
FIG. 21 illustrates another charging system including a chargeable device, in accordance with an exemplary embodiment of the present invention.

FIG. 21 illustrates a charging system 950 including a chargeable device 952 and a device 954. For example only, device 954 may comprise a Bluetooth headset. According to an exemplary embodiment, chargeable device 952 may be configured as a beacon transmitter and device 954 may be configured as a beacon receiver. Accordingly, chargeable device 952 and device 954 may be configured to communicate via a wireless interface 966, such as a Bluetooth interface. Chargeable device 952 may include a multi-media interface 956 and at least one antenna 958 and may be configured to receive wireless power from a wireless charging device 960 having at least one transmit antenna 962. Charging system

950 may further include a tether system 964, which may be distributed on chargeable device 952, device 954, or both.

Upon positioning chargeable device 952 in a charging region of charging device 960 (e.g., a public charging device), tether system 964 may be configured to "lock" multi-media interface 956. Multi-media interface 956 may be "unlocked," for example, upon receipt of a valid pin entered by a device user. Furthermore, tether system 964 may be configured to transmit a signal from chargeable device 952 to device 954. Device 954 may be configured to receive the transmitted signal over interface 966 so long as device 954 remains within communication range of chargeable device 952. In the event device 954 is removed from communication range with chargeable device 952, device 954 may issue an identifiable alert (e.g., a first audible alert) to notify a device user that device 954 is out of range. Further, if at any time during operation, chargeable device 952 is removed from the charging region of charging device 960, chargeable device 952 may send a signal to device 954 and, upon receipt of the signal, device 954 may issue an identifiable alert (e.g., a second, different audible alert) to notify the device user that chargeable device 952 has been removed from the charging region of charging device 960.

A contemplated operation of charging system 950 will now be described. Initially, a device user may position chargeable device 952 within a charging region of a public charging device, such as charging device 960. It is noted that a public charging device may be positioned in a public place such as, for example only, an airport, a restaurant, a hotel, etc. Further, while carrying device 952, the device user may leave the area proximate charging device 960. For example only, a device user may carry device 952 in a pocket or attach device 952 to their ear. In the event device 954 is removed out of communication range with chargeable device 952, device 954 may issue an identifiable alert (e.g., an audible alert) to notify a device user that device 954 is out of range. Further, if chargeable device 952 is removed from the charging region of charging device 960 (e.g., a third-party either purposely or accidentally removes chargeable device 952 from charging device 960), chargeable device 952 may send a signal to device 954 and, upon receipt of the signal, device 954 may issue an identifiable alert (e.g., another, different audible alert) to notify the device user that chargeable device 952 has been removed from the charging region of charging device 960. Accordingly, charging system 950 may provide a security feature to be employed while using a public charging device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A wireless charging device, comprising:
    a transmitter configured to wirelessly transmit power at a level sufficient to charge or power a chargeable device via a wireless power transfer field; and
    a controller configured to: detect a request for wireless charging via the wireless power transfer field, the request received from the chargeable device; receive an indication signal that the chargeable device is ready to transmit or receive information, the indication signal received from the chargeable device via a field disturbance of the wireless power transfer field; and
    establish a wireless data link with the chargeable device in response to the received indication signal, the wireless data link being over a wireless medium different than the wireless power transfer field.

2. The wireless charging device of claim 1, wherein the controller comprises a detection circuit configured to detect a field disturbance of a magnetic field established between the transmitter and a receiver of the chargeable device, the field disturbance indicative of the request for wireless charging.

3. The wireless charging device of claim 1, wherein the wireless data link comprises at least one of an NFC connection, a Bluetooth connection, a Wi-Fi connection, a 60 GHz connection, or a UWB connection.

4. The wireless charging device of claim 1, wherein the controller is further configured to perform an authentication process between the wireless charging device and the chargeable device before establishing the wireless data link.

5. The wireless charging device of claim 1, wherein the controller is configured to detect or receive the request via a wireless charging protocol.

6. The wireless charging device of claim 1, wherein the controller is further configured to initiate a key exchange to pair the chargeable device and the wireless charging device before establishing the wireless data link.

7. The wireless charging device of claim 1, wherein the controller is further configured to exchange data between the wireless charging device and the chargeable device via the wireless data link.

8. The wireless charging device of claim 7, wherein the data comprises at least one of photographs, videos, or music.

9. The wireless charging device of claim 1, further comprising a user interface configured to allow a user to interact with the data.

10. The wireless charging device of claim 1, wherein the controller is further configured to receive initiation data via the wireless power transfer field to establish the wireless data link.

11. The wireless charging device of claim 10, wherein the initiation data comprises pairing data to establish a Bluetooth connection.

12. The wireless charging device of claim 10, wherein the initiation data comprises an identifier corresponding to the chargeable device.

13. A method for wireless charging, the method comprising:
    detecting, at a wireless charging device, a request for wireless charging via a wireless power transfer field, the request received from a chargeable device;
    receiving, via a field disturbance of the wireless power transfer field, an indication signal that the chargeable device is ready to transmit or receive information;
    establishing a wireless data link with the chargeable device in response to the received indication signal, the wireless data link being over a wireless medium different than the wireless power transfer field; and
    wirelessly transmitting power at a level sufficient to charge or power the chargeable device via the wireless power transfer field.

14. The method of claim 13, wherein detecting the request comprises detecting a field disturbance of a magnetic field established between a transmitter and a receiver of the chargeable device indicating that the chargeable device is ready to receive wireless power.

15. The method of claim 13, further comprising initiating a key exchange to pair the chargeable device and the wireless charging device before establishing the wireless data link.

16. The method of claim 13, further comprising exchanging data between the wireless charging device and the chargeable device via the wireless data link.

17. The method of claim 13, wherein the wireless data link comprises at least one of an NFC connection, a Bluetooth connection, a Wi-Fi connection, a 60 GHz connection, or a UWB connection.

18. The method of claim 13, further comprising performing an authentication process between the wireless charging device and the chargeable device before establishing the wireless data link.

19. The method of claim 13, further comprising receiving initiation data via the wireless power transfer field for establishing the wireless data link.

20. The method of claim 19, wherein the initiation data comprises pairing data for establishing a Bluetooth connection.

21. The method of claim 19, wherein the initiation data comprises an identifier corresponding to the chargeable device.

22. A wireless charging device, comprising:
    means for wirelessly transmitting power at a level sufficient to power or charge a chargeable device via a wireless power transfer field:,
    means for detecting a request for wireless charging via the wireless power transfer field, the request received from the chargeable device;
    means for receiving, via a field disturbance of the wireless power transfer field, an indication signal that the chargeable device is ready to transmit or receive information; and
    means for establishing a wireless data link with the chargeable device in response to the received indication signal, the wireless data link being over a wireless medium different than the wireless power transfer field.

23. The wireless charging device of claim 22, wherein the means for detecting the request comprises means for detecting a field disturbance of a magnetic field established between the means for wirelessly transmitting power and a receiver of the chargeable device indicating that the chargeable device is ready to receive wireless power or ready to transmit or receive information.

24. The wireless charging device of claim 22, wherein the wireless data link comprises at least one of an NFC connection, a Bluetooth connection, a Wi-Fi connection, a 60 GHz connection, or a UWB connection.

25. The wireless charging device of claim 22, wherein the detecting means is configured to detect or receive the request via a wireless charging protocol.

26. The wireless charging device of claim 22, further comprising means for receiving initiation data via the wireless power transfer field to establish the wireless data link.

27. The wireless charging device of claim 26, wherein the initiation data comprises pairing data to establish a Bluetooth connection.

28. The wireless charging device of claim 26, wherein the initiation data comprises an identifier corresponding to the chargeable device.

29. A chargeable device configured to wirelessly receive power, the chargeable device comprising:
    means for wirelessly receiving power from a wireless charging device via a wireless power transfer field at a level sufficient to charge or power the chargeable device;
    means for providing a request for wireless charging to the wireless charging device via the wireless power transfer field;
    means for transmitting, via a field disturbance of the wireless power transfer field, an indication signal that the chargeable device is ready to transmit or receive information;
    means for establishing a wireless data link with the wireless charging device in response to transmitting an indication signal, the wireless data link being over a wireless medium different than the wireless power transfer field.

30. The chargeable device of claim 29, wherein the means for providing the request comprises means for causing a field disturbance of a magnetic field established between a transmitter of the wireless charging device and the means for receiving power indicating that the chargeable device is ready to receive wireless power or ready to transmit or receive information.

31. The chargeable device of claim 29, where the wireless data link comprises at least one of an NFC connection, a Bluetooth connection, a Wi-Fi connection, a 60 GHz connection, or a UWB connection.

32. The chargeable device of claim 29, wherein the chargeable device further comprises means for exchanging data between the chargeable device and the wireless charging device via the wireless data link.

33. The wireless charging device of claim 29, further comprising means for detecting charging level of a battery of the chargeable device and means for establishing the wireless data link in response to the detected charging level of the battery.

34. A chargeable device configured to wirelessly receive power, the chargeable device comprising:
    a receiver configured to wirelessly receive power from a wireless charging device via a wireless power transfer field at a level sufficient to charge or power the chargeable device; and
    a processor configured to:
        provide a request to the wireless charging device for wireless charging, the request provided via the wireless power transfer field;
        transmit an indication signal of readiness to transmit or receive information, the indication signal provided via a field disturbance of the wireless power transfer field; and
        establish a wireless data link with the wireless charging device in response to transmitting the indication signal, the wireless data link being over a wireless medium different than the wireless power transfer field.

35. The chargeable device of claim 34, wherein the processor is configured to provide the request by causing a field disturbance of a magnetic field established between a transmitter of the wireless charging device and receiver, the field disturbance indicative that the chargeable device is ready to receive wireless power or ready to transmit or receive information.

36. The chargeable device of claim 34, wherein the wireless data link comprises at least one of an NFC connection, a Bluetooth connection, a Wi-Fi connection, a 60 GHz connection, or a UWB connection.

37. The chargeable device of claim 34, wherein the processor is further configured to exchange data between the chargeable device and the wireless charging device via the wireless data link.

38. The wireless charging device of claim 34, wherein the processor is further configured to detect charging level of a battery of the chargeable device and establish the wireless data link in response to the detected charging level of the battery.

39. A method for wirelessly receiving power, the method comprising:
    providing a request from a chargeable device to a wireless charging device, the request provided via a wireless power transfer field;
    transmitting an indication signal that the chargeable device is ready to transmit or receive information, the indication signal provided via a field disturbance of the wireless power transfer field;
    establishing a wireless data link with the wireless charging device in response to transmitting the indication signal, the wireless data link being over a wireless medium different than the wireless power transfer field; and
    wirelessly receiving power from the wireless charging device via the wireless power transfer field at a level sufficient to charge or power the chargeable device.

40. The method of claim 39, wherein providing the request comprises causing a field disturbance of a magnetic field established between a transmitter and a receiver of the chargeable device.

41. The method of claim 39, where the wireless data link comprises at least one of an NFC connection, a Bluetooth connection, a Wi-Fi connection, a 60GHz connection, or a UWB connection.

42. The method of claim 39, wherein the method further comprising exchanging data between the chargeable device and the wireless charging device via the wireless data link.

43. The method of claim 39, further comprising detecting charging level of a battery of the chargeable device and establishing the wireless data link in response to the detected charging level of the battery.

44. A chargeable device configured to wirelessly receive power, the chargeable device comprising:
    a receiver configured to wirelessly receive power from a wireless charging device via a wireless power transfer field at a level sufficient to charge or power the chargeable device; and
    a processor configured to:
        send a first request to the wireless charging device for wireless charging, the first request provided via the wireless power transfer field;
        send a second request to establish a wireless data link, the second request provided via the wireless power transfer field; and transfer data to the wireless charging device via the wireless data link in response to providing the second request.

45. A wireless charging device, comprising:
a transmitter configured to wirelessly transmit power at a level sufficient to charge or power a chargeable device via a wireless power transfer field; and
a controller configured to:
  detect a first request for wireless charging via the wireless power transfer field, the request received from the chargeable device;
  receive a second request to establish a wireless data link with the chargeable device, the second request received via the wireless power transfer field from the chargeable device; and
  send initiation data to the chargeable device via the wireless power transfer field in response to the second request to establish the wireless data link.

* * * * *